United States Patent [19]

De Groot et al.

[11] Patent Number: 6,032,413
[45] Date of Patent: Mar. 7, 2000

[54] HYDROPHILIC PLANT GROWTH SUBSTRATE, COMPRISING A FURAN RESIN

[75] Inventors: Jacob Frank De Groot, Roermond, Netherlands; Thor Brede Husemoen, Roskilde, Denmark

[73] Assignee: Rockwool International A/S, Denmark

[21] Appl. No.: 09/029,600

[22] PCT Filed: Aug. 30, 1996

[86] PCT No.: PCT/EP96/03847

§ 371 Date: Jun. 11, 1998

§ 102(e) Date: Jun. 11, 1998

[87] PCT Pub. No.: WO97/07664

PCT Pub. Date: Mar. 6, 1997

[30] Foreign Application Priority Data

Aug. 30, 1995 [EP] European Pat. Off. ............. 95.202344
Dec. 7, 1995 [EP] European Pat. Off. ............. 95.203375

[51] Int. Cl.[7] ................................................. A01G 31/00
[52] U.S. Cl. .................................. 47/64; 47/58.1
[58] Field of Search ................. 47/64, 56, 58.1

[56] References Cited

U.S. PATENT DOCUMENTS

| | | | |
|---|---|---|---|
| 2,192,939 | 3/1940 | Slayter et al. ............................... | 47/56 |
| 3,854,988 | 12/1974 | Ashall et al. ............................ | 117/126 |
| 4,777,763 | 10/1988 | Shannon et al. ........................ | 47/64 X |
| 4,949,503 | 8/1990 | Blok ............................................. | 47/64 |
| 4,959,926 | 10/1990 | Moffet, Jr. .................................... | 47/59 |
| 5,009,031 | 4/1991 | Knop et al. ................................... | 47/64 |
| 5,060,419 | 10/1991 | De Graaf et al. .......................... | 47/64 |
| 5,086,585 | 2/1992 | Kafka .......................................... | 47/64 |
| 5,099,605 | 3/1992 | Moffet, Jr. .................................... | 47/59 |
| 5,133,151 | 7/1992 | Blok ............................................. | 47/64 |
| 5,600,919 | 2/1997 | Kummermehr et al. ................... | 47/59 |
| 5,724,766 | 3/1998 | Behrens .................................. | 47/64 X |
| 5,836,107 | 11/1998 | Behrens ...................................... | 47/56 |
| 5,888,803 | 3/1999 | Starkey ................................... | 47/1.1 X |

FOREIGN PATENT DOCUMENTS 2291251 11/1975 France .
4024727 6/1992 Germany .

*Primary Examiner*—Michael J. Carone
*Assistant Examiner*—Jeffrey L. Gellner
*Attorney, Agent, or Firm*—Webb Ziesenheim Logsdon Orkin & Hanson, P.C.

[57] ABSTRACT

The invention relates to a plant growth substrate, comprising a coherent, hydrophilic matrix of mineral wool fibres mutually connected via binder based on furan resin, and to use of a coherent, hydrophilic matrix of mineral wool fibres mutually connected via binder based on furan resin, as a plant growth substrate.

15 Claims, No Drawings

HYDROPHILIC PLANT GROWTH SUBSTRATE, COMPRISING A FURAN RESIN

BACKGROUND OF THE INVENTION

1. Field of the Invention

The present invention relates to a hydrophilic plant growth substrate, more in particular to a substrate based on a coherent matrix of mineral wool which is hydrophilic due to he use of a specific cured resin.

2. Background of the Invention

Plant growth substrates may have the form of plugs accommodated in a tray hole, of cubes having a foil around the standing side surfaces, or of plastic wrapped slabs.

The currently used plant growth substrates which are based on a coherent matrix of mineral wool use as a cured binder generally a phenol-formaldehyde resin. Due to the use of this type of binder, the matrix of mineral wool has to be provided with a so-called wetting agent in order to impart the substrate with hydrophilic properties. That is, the matrix can adsorb in a relatively short time period up to saturation amounts of water.

Although these types of known plant growth substrates are widely used, there is constant research to improve plant growth substrates, in particular the phytotoxicity of the chemicals used. This phytotoxicity may result for instance from the used wetting agent, or due to the binder.

SUMMARY OF THE INVENTION

Accordingly the present invention relates to plant growth substrates comprising a coherent, hydrophilic matrix of mineral wool fibers mutually connected via binder based on furan resin, and to the use of products produced by using a furan resin, for the culture of plants.

The plant growth substrates according to the invention comprise a coherent matrix of mineral wool. As mineral wool may be used stone wool, glass wool and/or slag wool. These matrices are produced using conventional production methods which only depend on the starting wool.

For the plant substrates according to the invention use may be made of a coherent matrix of mineral wool. Coherency is obtained by curing the applied furan resin such that the mutual fibers are mechanically connected, which connections are substantially water resistant. However, it is noted that the plant growth substrate may consist of a so-called granulate having the form of mineral wool flakes comprising a number of fibers and having a size of 0.2–5 cm.

When the plant growth substrate according to the present invention is cured and formed into a coherent hydrophilic matrix, the (higher density) substrate may have a compression strength up to 50 kPa, such as a compression strength in the range of 10–45 Kpa.

Hydrophilic character means in the context of the present invention that water is absorbed to a substantial extent/ amount which may be measured in the so-called sinking test in water to which no surfactant is added and in which no mechanical force is applied to the substrate. It is noted that without the use of a wetting agent the plant growth substrate of the invention has good plant growth (hydrophilic) properties.

DETAILED DESCRIPTION OF THE PREFERRED EMBODIMENT

The furan resins that are used in the present invention are based on the polymerization of at least a furan molecule having the general formula

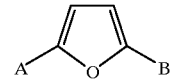

In this general formula A and B are polymerizable groups. Due to polymerization are formed dimer, oligomer and polymer molecules in which the furan ring structure is joined at least to one other furan structure by the group A and/or B. Furthermore, the furan ring may be less unsaturated, that is, it may comprise only one or no carbon-carbon double bond at the 2, 3 or 4-position in the ring structure.

The polymerizable groups A and B may be selected from hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, amines, imines, alkynes, alkyl halides, aromatic halides, olefinic halides, ethers, thiols, sulfides, nitriles, nitro groups, sulfones, sulfonic acids, and mixtures thereof.

Accordingly, the repeating groups in the product obtained by poymerization comprise furan, furfural, furfuryl alcohol, 5-hydroxymethyl-2-furancarboxyaldehyde, 5-methyl-2-furancarboxyaldehyde, 2-vinyl furoate, 5-methyl-2-vinylfuroate; 5-tertbutyl-2-vinyl furoate, 2-furfurylmethacrylate, 2-furfuryl methylmethacrylate, 2-vinyl furan, 5-methyl-2-vinyl furan, 2-(2-propylene) furan (or 2-methyl vinylidene furan), 5-methyl-2-methyl vinylidenefuran; furfurylidene aceton, 5-methyl-2-furfurylidene, aceton, 2-vinyl tetrahydrofuran, 2-furyl oxirane, 5-methyl-2-furyloxirane, furfuryl vinyl ether, 5-methyl-furfuryl vinyl ether, vinyl 2-furyl ketone bis-2,5-carboxyaldehyde furan, bis-2, 5-hydroxymethyl furan, 5-hydroxymethyl-2-ethyl furanacrylate, 2,5-furandicarboxylic acid, 2,5-furan diacid dichloride, 2,5-furan dicarboxylic acid dimethyl ester, 2,5-furan methylamine, 5-carboxy-2-furan amine, 5-methylester-2-furan amine, bis-(2,5-methylene isocyanate) furan, bis(2,5-isocyanate) furan, 2-isocyanate furyl, and 2-methylene isocyanate furyl.

The furan resins may be used as a concentrate or in diluted form in a suitable solvent, such as water. The solid content in a furan resin composition when injected may be as little as 1 wt. %, generally less than 40 wt %, preferably 2–30 wt %, more preferably 5–20 wt %. A suitable furan resin binder is a Farez M (TM) type from QO-Chemicals. Due to the use of these furan resins the plant growth substrate has an excellent brownish colour. The density of the substrate is about 10–150 kg/m$^3$, such as 40–120 kg/m$^3$.

The furan resin may be formed by polymerization, such as polyaddition polymerization and condensation polymerization. These polymerizations are known in the art.

In order to reduce the viscosity of the polymerization preparation to be used a co-solvent may be used. Suitable co-solvents are organic mono-, di- and polyacids, such as levulinic acid and maleic acid. Co-solvents may be used in an amount up to 15 wt %, such as 2–10 wt % or generally 4–8 wt %.

In order to cure a furan resin, the furan resin composition may comprise a catalyst. Examples are inorganic and organic acids, such as hydrochloric acid and maleic acid. Other catalyst examples are Friedel-Crafts catalysts, such as aluminum chloride. Other examples are salts of inorganic and organic acids such as ammonium sulfate, ammonium nitrate and urea salt of toluene sulfonic acid. Depending on the type of catalyst there may be used up to 20 wt %, generally in the range of 1–15 wt %, such as preferably 8–10 wt %.

In order to improve the cohesion for binding to the fiber surface or fiber material a coupling agent may be included. Examples of coupling agents are silanes or organotitanates and oganozirconates. Examples of suitable silane coupling agents are N-Methyl-3-aminopropyl-trimethoxysilane and 3-aminopropyl-triethoxysilane.

Furthermore, surfactants and extenders may be used in the furan resin composition.

In order to avoid dust formation during plant substrate production and handling a mineral, hydrophobic oil may be added, but the formed substrate maintains its hydrophilic properties.

Instead of using only furan-like molecules in the polymerization reaction, copolymerizations may be used as well, in which other monomers are used, such as formaldehyde and phenol. By using these co-monomers the hydrophilic properties of the resin may be adapted in the desired sense. Formaldehyde and phenol may be used in more amounts up to 50%, generally in an amount of 1–45%, such as 2–30%, preferably 5–10%. Accordingly, due to the use of those monomers the hydrophilic character may be adjusted in the desired sense. However, when including other monomers in the binder composition, formaldehyde is a preferred monomer.

When using formaldehyde as a co-monomer, it is preferred to include in the furan resin composition a formaldehyde scavenger, such as ammonia or urea. Dependant on the amount of formaldehyde used ammonia and/or urea may be present in amounts up to about 5 wt %, such as 0.1–3 wt %, in particular 0.5–2 wt %.

Preferred is a furan resin based on furfurylalcohol and comprising a minor amount of formaldehyde, catalysts, formaldehyde scavengers and coupling agent.

This furan resin composition is used and applied to stone wool fibres after their formation while airborne. Furan resin is applied in such an amount that the resin content of the plant growth substrate is about 1–10 wt %, such as 1.5–5wt % in particular 2–3.5 wt %.

It is noted that even if during the production of the plant growth substrate according to the invention 0.2–0.5% impregnating oil is used water absorption does not changed and is still up to about 100%. Hereafter Table 1 gives properties of the plant growth substrates according to the patent invention based on a furan resin, in particular a furfurylalcohol resin.

TABLE 1

| Density | 100 kg/m³ | 45 kg/m³ |
|---|---|---|
| Resin content | 3.1 wt % | 2.9 wt % |
| Compression strength | 43 kPa | |
| Aged compression strength | 36 kPa | |
| Delamination strength | 11.5 kPa | |
| Swelling | 2.5% | |
| Water absorption | 100 vol % | 100 vol % |
| Tensile strength | | 15.5 kPa |

The following examples show the suitability of the hydrophilic plant growth substrates according to the invention, which comprise the furan resin binder. It is emphasized that the furan resin binder based substrates according to the invention do not contain a wetting agent. To the contrary the conventional phenolic resin based substrates for comparison purposes in the example do contain traditional wetting agents. These examples are given for the purpose of illustrating the invention and not intended to limit the scope of the invention thereto.

EXAMPLE 1

The plant growth substrate was conventionally produced in a density of 45 and 100 kg/m³ and used for plant growth (furan resin content about 3 wt %). Cucumber plants were grown on these substrates and resulted in plants growing and yielding cucumbers similar to plants grown on plant grow substrates based on phenol-formaldehyde resin and a wetting agent.

EXAMPLE 2

Similar growth substrates of the invention as used in example 1 (further comprising 0.5% impregnating oil) were used for growing garden-cress (common nutrient solution; EC=1, pH 6.7). In comparison to a standard growth substrate or granulate no growth differences have been noted up to after eight days. In a toxicity test no growth differences were observed after eight days.

EXAMPLE 3

Standard size growth blocks of the invention with furan resin as binder were tested in propagation trials set up in a greenhouse. The growth blocks contained 2 wt % furan resin and during its production no mineral oil was added. Because the hydrophilic properties of the growth blocks are essential, the sinking times of the blocks were measured during the production and excellent sinking times of only 8–12 seconds were obtained. Tomatoes and d cucumbers were tested and the results were compared with growth blocks made of the same mineral wool but with phenolic resin as binder.

For tomatoes, 13 days after sowing the tomato plants were planted in the growth blocks and the results were collected 23 days after sowing.

For cucumber, sowing took place after saturation and the results were collected 22 days after sowing.

The plant growth results (fresh weight [g/plant]) are as follows. Tomato plants 136.2 g/plant; and 116.2 g/plant for furan resin and phenolic resin, respectively.

For cucumbers the growth blocks comprising furan resin provided 82.3 gram per plant a phenolic resin growth blocks provided 81.5 gram per plant.

EXAMPLE 4

Full scale growth trials in slabs at growers with cucumber, tomato and sweet pepper gave results from propagation tests as shown in Table 2. The slabs contained 2–3.3 wt % binder and the result is given for the growth substrate with furan resin as % of growth substrate with phenolic resin.

TABLE 2

| | CUCUMBER | TOMATO | SWEET PEPPER |
|---|---|---|---|
| Plant height | 15 days: 99% | 14 days: 110% | 20 days: 99% |
| | 22 days: 100% | 20 days: 113% | 28 days: 104% |
| Fresh weight | 15 days: 105% | 14 days: 105% | 20 days: 102% |
| | 22 days: 101% | 20 days: 109% | 28 days: 97% |

EXAMPLE 5

Full scale growth trials at growers with cucumber, tomato and sweet pepper gave the following conclusions evaluated after 4 to 6 months after planting date. No significant difference was observed furan resin bonded slabs compared with phenolic resin bonded slabs for penetration resistance, pH, water content and electrical conductivity. The furan resin bonded material has better rooting from the start, a slightly earlier forming of crop fruits and better slab strength.

We claim:

1. Plant growth substrate, comprising a coherent, hydrophilic matrix of mineral wool fibres mutually connected via binder based on furan resin.

2. Substrate as claimed in claim 1, wherein the furan resin is obtained by polymerization of at least a furan molecule having the general formula

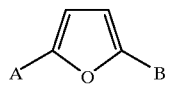

and/or its less unsaturated analogues, wherein A and B are each a polymerizable group.

3. Substrate as claimed in claim 2, wherein A and B are independently selected from the group comprising hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, amines, imines, alkynes, alkyl halides, aromatic halides, olefinic halides, ethers, thiols, sulfides, nitriles, nitro groups, sulfones, sulfonic acids, and mixtures thereof.

4. Substrate according to claim 2, wherein the furan molecule is furfurylalcohol.

5. Substrate a claimed in claim 1, wherein the furan resin comprises a co-solvent.

6. Substrate according to claim 1, wherein the furan resin comprises a polymerization catalyst.

7. Substrate according to claim 1, wherein the furan resin comprises a coupling agent.

8. Substrate according to claim 1, wherein the furan resin contains at least one substance selected from the group consisting of a surfactant, a coloring agent and an extender.

9. Substrate according to claim 1, wherein the furan resin is obtained by copolymerization.

10. Substrate according to claim 1, wherein the polymerization comprises further formaldehyde and/or phenol.

11. Substrate according to claim 10, wherein the furan resin comprises a formaldehyde scavenge.

12. Substrate according to claim 1, having a density of 15–150 kg/m$^3$.

13. Substrate according to claim 1, wherein the binder is cured.

14. A method of preparing a plant growth substrate comprising the steps of admixing a quantity of mineral wool fibres with a furan-resin based binder to create a coherent, hydrophilic matrix of mineral wool fibres mutually connected via said binder.

15. The method according to claim 14 further comprising the final step of curing the admixed mineral wool fibres and furan-resin based binder subsequent to their admixture.

* * * * *

UNITED STATES PATENT AND TRADEMARK OFFICE
CERTIFICATE OF CORRECTION

PATENT NO.  : 6,032,413
DATED       : March 7, 2000
INVENTOR(S) : Jacob Frank De Groot et al.

It is certified that error appears in the above-identified patent and that said Letters Patent is hereby corrected as shown below:

Title Page, in the title, after "Substrate" delete comma.

Column 1 Line 2, in the title, after "Substrate" delete comma.

Column 1 Line 11 "to he" should read --to the--.

Column 3 Line 48 "does not changed" should read --does not change--.

Column 4 Line 13 "plant grow" should read --plant growth--.

Column 4 Line 34 between "and" and "cucumbers" delete "d".

Column 4 Line 46 "a phenolic" should read --and phenolic--.

Column 6 Line 1, Claim 5, "a claimed" should read --as claimed--.

Column 6 Line 16, Claim 11, "scavenge" should read --scavenger--.

Signed and Sealed this

Thirteenth Day of February, 2001

Attest:

NICHOLAS P. GODICI

*Attesting Officer*    Acting Director of the United States Patent and Trademark Office